APPARATUS FOR FORMING CERAMIC SHELL MOLDS

Original Filed April 8, 1968 5 Sheets-Sheet 1

INVENTORS
CLAUDE H. WATTS
FLOYD D. BENTHIMER
BY
Watts, Hoffmann, Fisher & Heinke
ATTORNEYS.

APPARATUS FOR FORMING CERAMIC SHELL MOLDS

Original Filed April 8, 1968 5 Sheets-Sheet 3

INVENTORS
CLAUDE H. WATTS
FLOYD D. BENTHIMER
BY
Watts, Hoffmann, Fisher & Heinke
ATTORNEYS.

APPARATUS FOR FORMING CERAMIC SHELL MOLDS

Original Filed April 8, 1968 5 Sheets-Sheet 3

INVENTORS
CLAUDE H. WATTS
FLOYD D. BENTHIMER
BY
Watts, Hoffmann, Fisher & Heinke
ATTORNEYS.

APPARATUS FOR FORMING CERAMIC SHELL MOLDS

Original Filed April 8, 1968 5 Sheets-Sheet 4

INVENTORS
CLAUDE H. WATTS
FLOYD D. BENTHIMER
BY
Watts, Hoffmann, Fisher & Heinke
ATTORNEYS.

APPARATUS FOR FORMING CERAMIC SHELL MOLDS

Original Filed April 8, 1968 5 Sheets-Sheet 5

INVENTORS
CLAUDE H. WATTS
FLOYD D. BENTHIMER
BY
Watts, Hoffmann, Fisher & Heinke
ATTORNEYS.

United States Patent Office

Re. 27,586
Reissued Feb. 27, 1973

27,586

APPARATUS FOR FORMING CERAMIC SHELL MOLDS

Claude H. Watts, Mayfield Heights, and Floyd D. Benthimer, Warrensville Heights, Ohio, assignors to Precision Metalsmiths, Inc.

Original No. 3,590,905, dated July 6, 1971, Ser. No. 719,575, Apr. 8, 1968. Application for reissue Nov. 15, 1971, Ser. No. 198,620

Int. Cl. B22c *13/08*

U.S. Cl. 164—165 16 Claims

Matter enclosed in heavy brackets [ ] appears in the original patent but forms no part of this reissue specification; matter printed in italics indicates the additions made by reissue.

ABSTRACT OF THE DISCLOSURE

Apparatus for use in forming ceramic shell molds including a slurry tank, a pair of pivoted arms adapted to support a pattern setup for rotation about a horizontal axis and to lower the setup into the tank for the application of a slurry coating, and a cover adapted to close and seal the tank, whereby a vacuum can be produced therein during application of the slurry coating.

BACKGROUND OF THE INVENTION

This invention relates generally to the art of investment casting, and more specially to ceramic shell-molding techniques of precision casting wherein shell molds suitable for casting metal are prepared by building up layers of refractory material around disposable patterns which are subsequently removed from the molds.

As is known to those familiar with the art of investment casting, ceramic shell molds are prepared using patterns which are replicas of the parts to be cast in metal, including the necessary gates and risers, and which are formed of an expendable material, such as wax, a synthetic resin, or a wax and synthetic resin composition. These patterns are attached to a sprue member to constitute what is commonly known as a "setup" or "tree." The formation of a shell mold around the setup is accomplished by dipping it into a refractory slurry of controlled viscosity followed by directional draining to coat the patterns uniformly. After draining excess slurry from the setup, the slurry coating is then sanded or stuccoed while wet with coarser refractory particles, such as by dipping the setup into an air-fluidized bed of dry refractory material. The result is a cost of ceramic material having refractory particles embedded in the surface. This coat is hardened, usually by air drying at room conditions. After the first coat is sufficiently hard and dry, the steps of dipping, draining, stuccoing and drying are repeated until a refractory shell having a sufficient thickness to resist the stresses occurring in subsequent operations has been built up around the setup. The usual shell thickness is from about ⅛ inch to about ½ inch, although thicker or thinner shells may be formed for special situations. The disposable patterns are then removed from the shell mold and the mold prepared for the casting operation.

A refractory slurry for coating the setup may consist essentially of a suspension of fine refractory powder in a binder solution comprised mainly of a colloidal silica sol and small amounts of an organic film former, a wetting agent and a defoaming agent. The refractory powder usually is minus 100 mesh. Silicon dioxide, fused quartz, fused aluminum oxide, tabular alumina, and zircon (zirconium silicate) are among the materials more commonly used. The stuccoing material is generally of much larger particle size than the refractory powder used in the slurry.

Suitable refractory materials employed for stuccoing include granular zircon, fused silica, silica, various aluminum silicate grogs including ½ inch, sillimanite, fused alumina, tabular aluminum, and similar materials.

In order to obtain a satisfactory shell for casting, it is necessary to form a dense, void-free coating around the setup. This requires the setup to be carefully rotated so that the slurry will flow over and coat all areas of the setup uniformly. A satisfactory coating is particularly difficult to obtain when the workpiece patterns have relatively complex shapes, including holes, slots, narrow passageways, surface detail, and the like. The viscosity of the slurry is often such that it will not easily flow into and cover the complex areas of the patterns. There is also a tendency for air to be trapped in restricted areas of the patterns and/or in previously applied coatings so as to weaken the shell and produce voids which may result in the cast piece being scrapped. Further, when the setup consists of a large number of closely spaced patterns, there is a tendency for a substantial amount of the slurry to be retained between the patterns so as to form relatively thick wall portions in these areas. The thick wall portions are difficult to dry properly and may crack when the molds are heated, as during the pattern removal operations and/or when the molds are fired prior to casting.

SUMMARY OF THE INVENTION

The present invention is particularly concerned with the provision of apparatus for applying slurry coatings to pattern setups in the manner described in U.S. Pat. No. 3,249,972, issued May 10, 1966, to Claude H. Watts et al. As disclosed in that patent, the pattern setup is horizontally positioned for rotation about its longitudinal axis so that rows of patterns can be moved into and out of a slurry by rotating the setup. The rotation of the setup on its horizontal axis has been found to produce excellent coating results and to avoid the problems discussed above. As the setup is rotated to move the rows of patterns into and out of the slurry, the angular positions of the patterns are continuously changed. As a result, the slurry can run over all portions of the pattern and fill all of the pattern cavities and other difficult to fill areas so as to produce a uniform coating. By rotating the setup on its horizontal axis following the coating operation, it is also possible to obtain improved directional draining of excess slurry and to prevent the slurry from being trapped between closely spaced patterns and forming thick, difficult to dry wall areas.

In accordance with the preferred embodiment of the present invention, the setup is supported for rotation on a horizontal axis by a pair of pivotally mounted support arms associated with the slurry tank. When the arms are pivoted downwardly, the setup is lowered to a desired height in the slurry contained in the tank and the setup is rotated about its axis to produce the slurry coating. The arms are subsequently pivoted upwardly to raise the setup from the slurry and rotation of the setup is continued to effect the improved directional draining operation. A cover or hood is connected to the tank and to the arms in such a manner that the arms will be lowered with the cover when it is moved to close the tank and so that the arms will be raised when the cover is opened. When the cover has been closed and the setup lowered into the slurry, a vacuum may be drawn to remove dissolved and occluded air from the slurry. The vacuum is continued for a predetermined period of time and air at atmospheric pressure is then introduced into the slurry tank so that the slurry is forced by air pressure into all of the difficult to fill areas of the patterns. The vacuum treatment prevents the detrimental occurrence of air bubbles on the surfaces of the patterns and assures that the slurry will uniformly coat and fill the intricate pattern details. The vacuum treatment also assures that a dense, refractory coating will be produced which is substantialy free of voids caused by escaping gases.

A general object of the present invention is to provide a new apparatus which facilitates the application of a slurry coating to a setup in an improved manner.

Another object of the invention is to provide apparatus for applying dense, void-free slurry coatings to pattern setups in a manner which obtains uniform coverage and reduces the problems of filling and coating intricate pattern cavities, passages, openings, and other detail.

Still another object of the invention is to provide apparatus for applying slurry coatings to a pattern setup by an operation in which the pattern setup is rotated on a horizontal axis to move the patterns into and out of the slurry.

Other objects and advantages of the invention will be apparent from the following detailed description when taken in conjunction with the accompanying drawings.

DESCRIPTION OF THE PREFERRED EMBODIMENT

Figure 1:
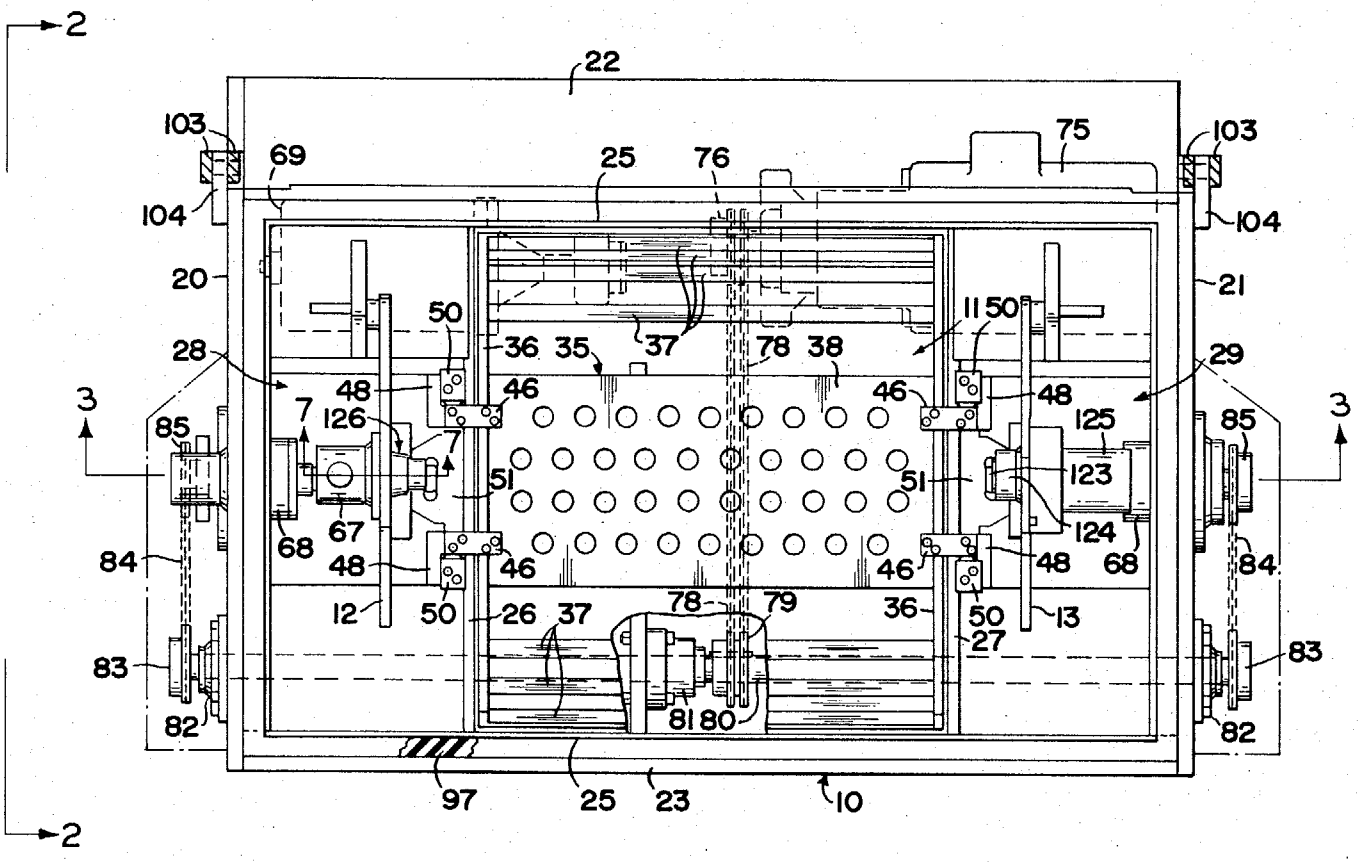
FIG. 1 is a plan view of the present invention taken substantially along the line 1—1 of FIG. 2.
Figure 2:
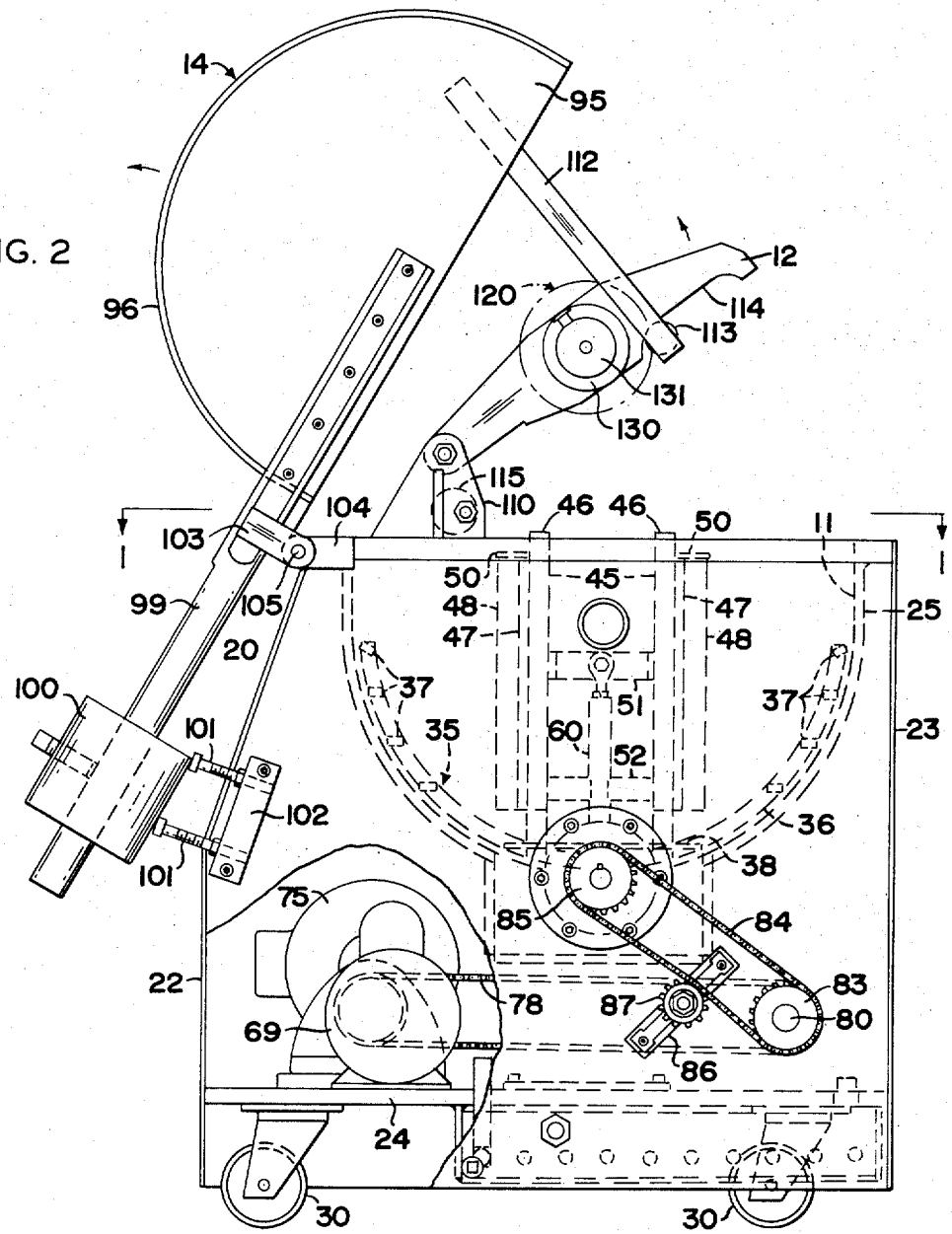
FIG. 2 is an end elevational view taken substantially on the line 2—2 of FIG. 1.
Figure 5:
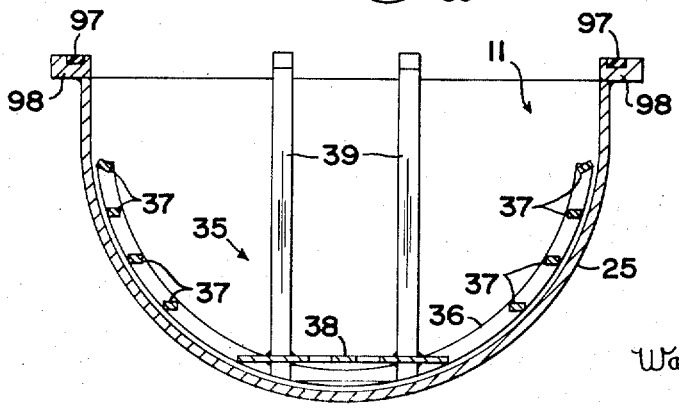
FIG. 5 is a fragmentary, vertical cross-sectional view taken through the slurry tank of the apparatus.
Figure 3:
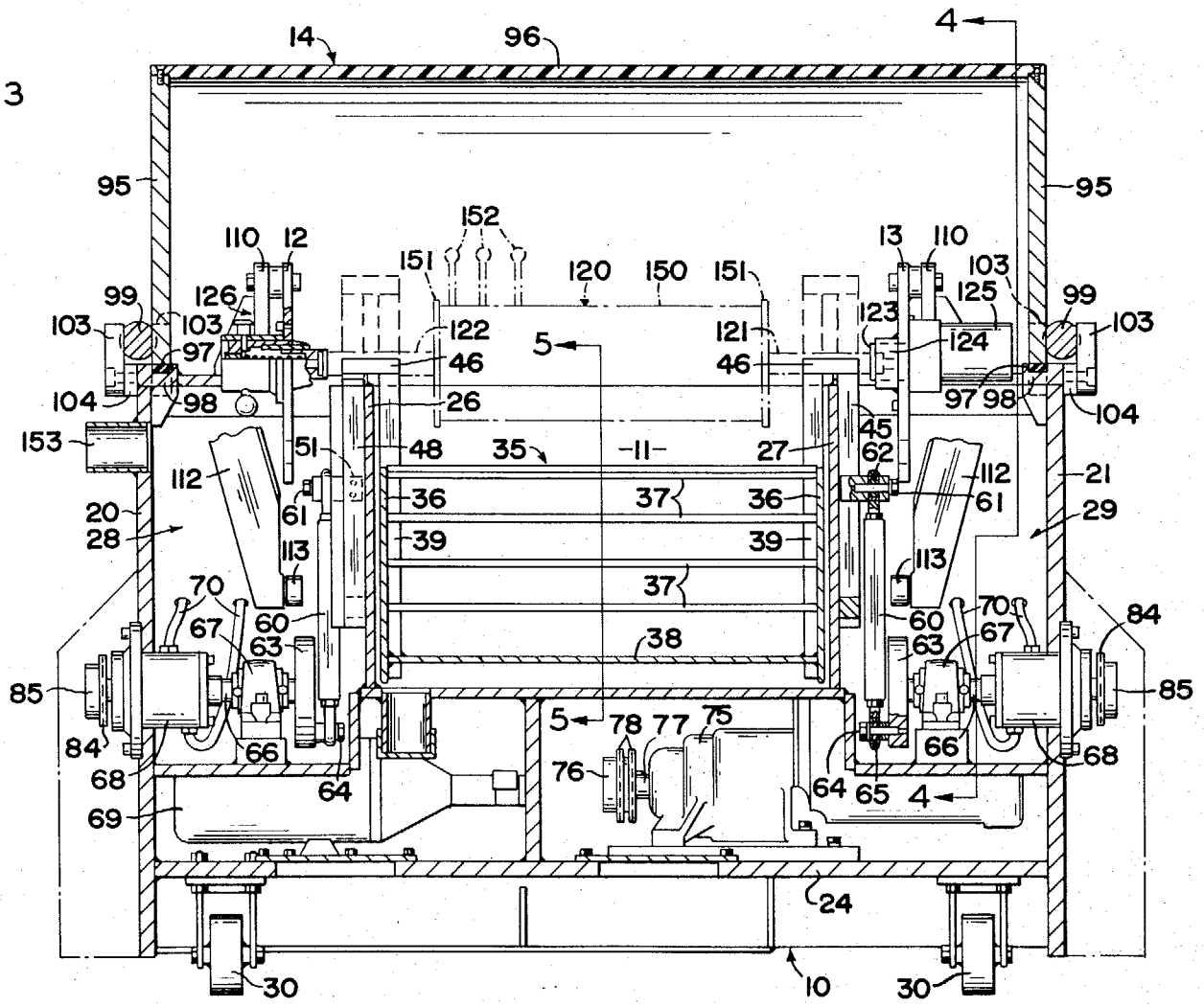
FIG. 3 is a vertical cross-sectional view taken substantially along the line 3—3 of FIG. 1.

Referring now to the drawings, and to FIGS. 1–3 in particular, the apparatus of the invention is shown to comprise a frame structure 10 which includes a slurry tank 11. As will hereinafter be described in more detail, a pair of spaced arms 12, 13 are pivotally connected to the frame 10 and are adapted to support a pattern setup for rotation about a horizontal axis. A counterweighted cover 14 is hinged to the frame structure 10 in position to close the tank 11 so that the slurry in the tank can be placed under a vacuum. The cover 14 is associated with the arms 12, 13 so that the arms will be pivoted to lower the supported setup into the tank 11 at the same time the cover is moved to close the tank. When the cover 14 is subsequently moved to open the tank, the arms 12, 13 will be pivoted upwardly to withdraw the setup from the tank.

In the illustrated embodiment, the frame structure 10 is a welded construction comprised of end walls 20, 21, a rear wall 22, and a front wall 23. A baseplate 24 extends between the end walls 20, 21 below the tank 11.

The slurry tank 11 is preferably semicylindrical in shape and is defined by a generally semicylindrical sidewall 25 which extends the length of the frame structure 10 between its end walls 20, 21 and by transversely extending end walls 26, 27. The tank end walls 26, 27 are inwardly spaced from the frame structure end walls 20, 21, respectively, to define a pair of chambers 28, 29 at opposite ends of the tank 11. The frame 10 is movable on wheels 30 which are suitably secured to the undersurface of the baseplate 24.

An agitator assembly 35 is mounted for vertical reciprocation within the tank 11 for the purpose of maintaining the refractory powder of the slurry in suspension. As is best shown in FIGS. 1–3 and 5, the agitator assembly 35 is comprised of a pair of semiannular members 36 which are located adjacent the end walls 26, 27 of the tank 11 and conform to the curvature of the tank sidewall 25. The semiannular members 36 are connected by a plurality of spaced, parallel crossbars 37 which have their ends welded to the members 36. A flat plate 38 having a plurality of holes therethrough is located near the bottom of the tank 11 and extends between and is secured to the lower portions of the semiannular members 36. The agitator assembly 35 further includes a pair of spaced bars 39 which extend upwardly to the top of the tank 11 at each end of the assembly. The lower ends of the bars 39 are welded to the ends of the plate 38 and to the semiannular members 36.

Figure 4:
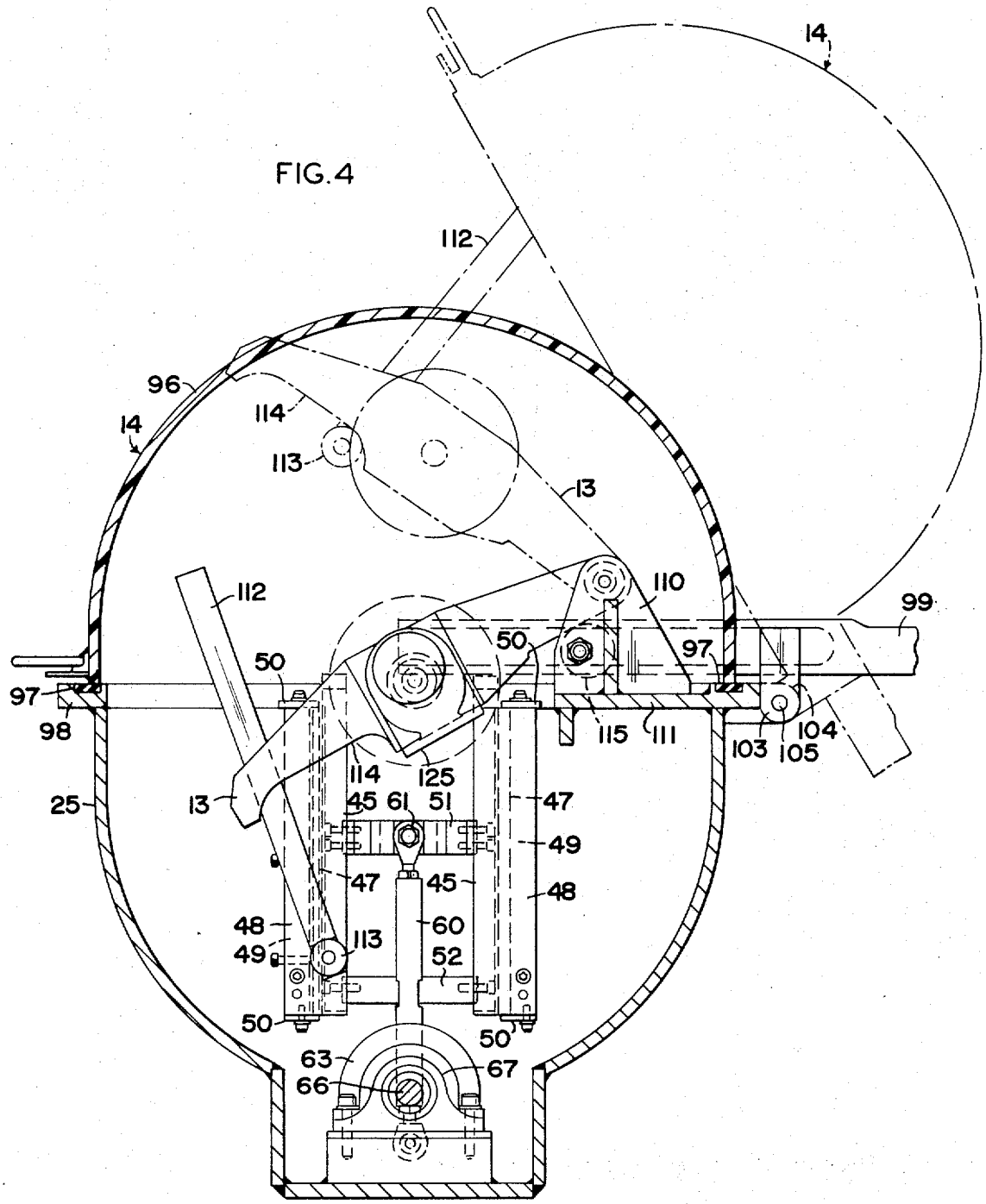
FIG. 4 is a vertical cross-sectional view taken substantially along the line 4—4 of FIG. 3.
Figure 6:
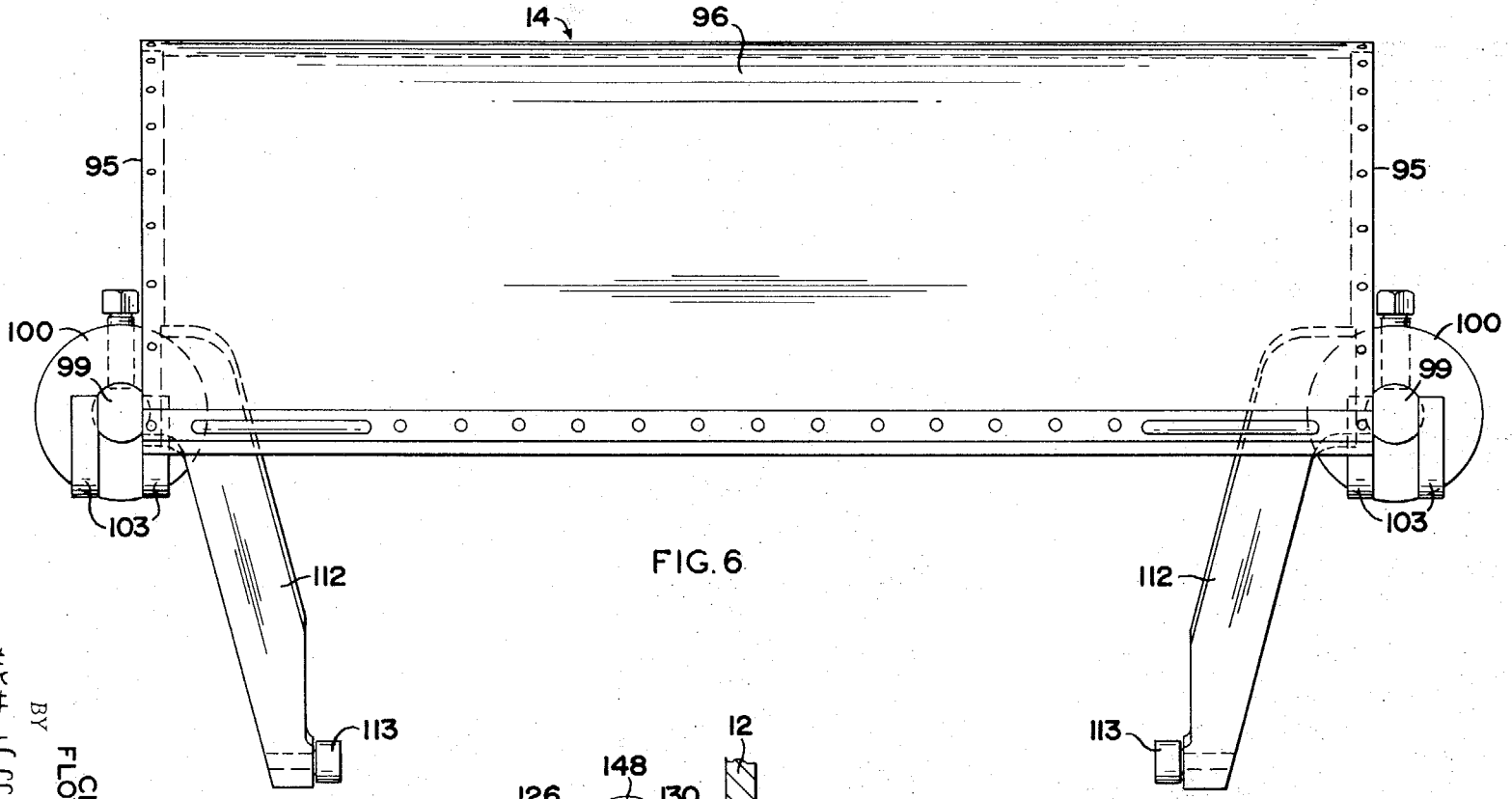
FIG. 6 is an elevational view of the hood or cover.

The agitator assembly 35 is vertically reciprocated within the tank 11 by structure which includes a pair of vertically extending slides 45 which are located adjacent the outer surfaces of each of the tank end walls 26, 27. The upper end of each of the slides 45 projects above the upper edge of the adjacent tank end wall and is rigidly attached to the upper end of one of the agitator assembly bars 39 by a plate 46. The slides 45 are vertically reciprocal between gibs 47. As is best shown in FIGS. 1, 3 and 4, each of the gibs 47 is fixed in a channel defined by a vertical keeper plate 48 which is attached to an end wall of the tank 11 by a vertical spacer bar 49. Upper and lower gib plates 50 are fixed to the ends of the spacer bar 49 and overlie upper and lower end portions of the gibs 47. The two slides 45 at each end of the tank 11 are rigidly connected by upper and lower crosspieces 51, 52, respectively, to form a slide assembly.

Vertical reciprocal movement is imparted to each of the slide assemblies 45, 51, 52 through a connecting rod 60. The upper end of each of the connecting rods 60 is pivotally connected to the upper crosspiece 51 of a slide assembly by a shouldered screw 61 which carries a ball 62 that is received within a socket in the upper end of the connecting rod. The lower end of each of the connecting rods 60 is pivotally connected to a crank 63 by a shouldered screw 64 which carries a ball 65 received in a spherical socket of the lower end of the connecting rod. Each of the cranks 63 is secured to the end of a shaft 66 which is rotatably mounted by a pillow block assembly 67. The pillow block assemblies 67 are mounted in the bottoms of the chambers 28, 29.

Referring particularly to FIG. 3, it will be seen that the shafts 66 extend through seal assemblies 68 mounted in the end walls 20, 21 of the frame structure 10. The seal assemblies 68 are of conventional construction and are provided to form an airtight seal around the rotatable shafts so that a vacuum can be drawn in the tank 11 and the chambers 28, 29 when the cover 14 has been closed. Oil is circulated through each of the seal assemblies 68 by an oil pump 69 which is mounted on the frame baseplate 24 below the chamber 28. The oil pump 69 is connected to the seal assemblies 68 by conduits 70 which extend through the sides of the chambers 28, 29.

The shafts 66 are rotated by a gear motor 75 which is mounted on the frame baseplate 24 below the chamber 29 and which is connected to the shafts by a chain and sprocket assembly. Referring particularly to FIGS. 1–3, it will be seen that a drive sprocket 76 is mounted on the motor drive shaft 77 and is connected by chains 78 to a sprocket 79 on a driven shaft 80. The driven shaft 80 extends the length of the frame structure 10 adjacent its front wall 23 and is rotatably mounted by bearings 81, 82. The ends of the shaft 80 project through the bearings 82 mounted in the end walls 20, 21 of the frame structure 10 and carry sprockets 83. The sprockets 83 are connected by chains 84 to sprockets 85 on the ends of the shafts 66. An adjustable chain tensioner assembly 86 which has a sprocket 87 may be secured to each of the frame end walls 20, 21 for engagement with the chains 84 in the manner shown in FIG. 2.

The cover 14 is in the form of a semicylindrical hood having end walls 95 and a curved sidewall 96 which is preferably made of a transparent plastic material so that the operations within the tank 11 can be observed when the cover is closed. In its closed position, the edges of the cover sidewall and end wall are engaged against a seal ring 97 which is mounted in a groove of a lip 98 that extends around the upper edges of the walls 20, 23 of the frame structure 10. A rearwardly extending counterweight rod 99 is secured to each of the cover end walls 95 and a counterweight 100 is adjustably mounted on each rod. In the open position of the cover shown in FIG. 2, the counterweights 100 abut the heads of screws 101 which are carried in bracket assemblies 102 fastened to each of the frame end walls 20, 21. The cover 14 is hingedly connected to the frame 10 by structure including a pair of ears 103 which are secured to opposite sides of each of the counterweight rods 99 to define a clevice. Rearwardly extending arms 104, which are fixed to the end walls 20, 21 of the frame 10, project between each pair of ears 103 and are pivotally connected therewith by shoulder screws 105.

Each of the pattern setup supporting arms 12, 13 is pivotally connected at its rearward end to an upstanding plate 110. The upstanding plates 110 are secured to horizontal plates 111 which are located at the rear corners of the frame structure 10 defined by the end walls 20, 21 and the rear wall 22. As generally described above, the support arms 12, 13 are pivoted between raised and lowered positions by movement of the cover 14. To this end, a pair of downwardly projecting struts 112 are fixed to the inner surfaces of the cover end walls 95. Rollers 113 are carried at the lower ends of the struts 112 for engagement with undersurfaces 114 of the forward end portions of the arms 12, 13. In the open position of the cover 14 illustrated in FIG. 2, the rollers 113 are in engagement with the surfaces 114 to maintain the arms 12, 13 in a raised position. As the cover 14 is closed, the rollers 113 roll along the surfaces 114 toward the forward ends of the arms 12, 13 to allow the arms to pivot toward a lowered position. When the cover is in the closed position shown in FIG. 4, the rollers 113 are disposed below and out of engagement with the arm surfaces 114.

An eccentrically mounted roller 115 (FIGS. 2 and 4) is preferably associated with each of the arms 12, 13 to serve as an adjustable abutment stop for the arm in its lowered position. The rollers 115 are carried by the upstanding plates 110 in position to be engaged by undersurfaces of the arms 12, 13 near their pivoted ends when the cover 14 is closed. By adjusting the rollers 115 about their eccentric mountings, it is possible to vary the distance through which the arms are swung to their lowermost position and, hence, the height to which a setup supported by the arms is immersed in slurry in the tank 11.

As shown in FIG. 3, a pattern setup 120 which includes a through rod having oppositely extending end portions 121, 122 is adapted to be supported by the arms 12, 13 for rotation about a horizontal axis. The end 121 of the setup rod is received in a cup or shaft socket 123 which is rotatable within a sleeve 124 welded to the side of the arm 13 between its ends. A gear motor 125 is carried on the opposite side of the arm 13, and the output shaft of the gear motor extends through the arm into driving connection with the cup or shaft socket 123 for rotating the setup 120. The other end 122 of the setup rod is received within a mounting assembly 126 carried by the support arm 12 between its ends.

Figure 7:
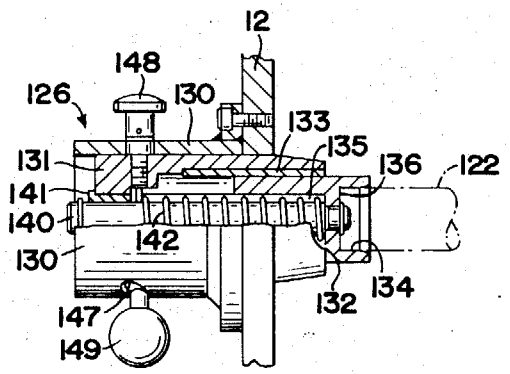
FIG. 7 is an enlarged view, partially in cross section, of a portion of the apparatus.

Referring particularly to FIG. 7, the mounting assembly 126 is shown to comprise a sleeve 130 which is secured to the arm 12 intermediate its ends, an axially adjustable sleeve 131 which is mounted within th e fixed sleeve 130 and projects through the arm 12 toward the other arm 13, and a spring-biased, axially movable member 132 which is rotatably journaled within the adjustable sleeve 131 by a bearing 133. The member 132 has a cup or socket 134 in its outer end portion adapted to receive the end 122 of the setup rod and a relatively deeper recess 135 which is formed in its inner end and is separated from the socket 134 by a radial wall 136. The member 132 is fixed on a rod 140 which extends axially of the assembly 126. One end of the rod 140 extends through a bushing 141 mounted in the end wall of the sleeve 131, and the opposite end of the rod extends through the recess 135 and the radial wall 136. The wall 136 of the member 132 is received between a shouldered portion of the rod 140 and a snap ring on its outer end, whereby the member 132 and the rod 140 are rotatable and axially movable together. A spring 142 surrounds the rod 140 and is engaged between the bushing 141 and the radial wall 136 of the member 132 to resiliently urge the member toward the socket 123 in the arm 13.

The setup is engaged on the support arms 12, 13 by first inserting the end 122 of the setup rod into the socket of cup 123 of the arm 12. When the member 132 is arm 12 is then pressed inwardly relative to the sleeve 131 against the biasing action of the spring 142 to permit the end 121 of the setup rod to be inserted into the socket or cup 123 of the arm 13. When the member 132 is subsequently released, the spring 142 urges the cup outwardly of the sleeve 131 so that the setup is firmly supported for rotation by the gear motor 125.

In the preferred embodiment of the invention provision is also made for adjusting the mounting assembly 126 axially in order to accommodate setups of different lengths. As shown in FIG. 7, the fixed sleeve 130 has a peripheral cam slots 147 formed through its sidewall. A shoulder screw 148 is inserted through the cam slot 147 and is threaded into the axially adjustable sleeve 131. A handle 149, which is circumferentially spaced from the shoulder screw 148, also extends into the cam slot 147 and is rigidly attached to the adjustable sleeve 131. The subassembly comprised of the sleeve 131, the member 132 and the rod 140 can be axially adjusted to accomodate a setup of a desired length by loosening the shoulder screw 148 and rotating the sleeve 131 by means of the handle 149. Movement of the handle 149 along the cam slot 147 serves to move the sleeve 131 axially until it is in the desired position, whereupon the shoulder screw 148 is again tightened to secure the sleeves 130 and 131 together.

Before describing the operation of the apparatus in detail, reference is again made to FIG. 3 which, as previously noted, illustrates a pattern setup 120 suitable for use in forming a ceramic shell mold by a procedure which includes the steps of repeatedly coating the setup with refractory slurry and directionally draining the slurry to obtain uniform coverage. The illustrated pattern setup 120 is of a typical construction including a sprue member 150 which may be in the form of a cylindrical drum having an outer surface formed of an expendable material such as wax. The ends of the drum are closed by plates 151, from which the shafts and a rod extends through the drum to provide the oppositely extending rod end portions 121, 122. A plurality of workpiece patterns 152 are attached in rows to the outside of the sprue member or drum 150 in the manner shown in FIG. 3 to complete the setup.

When using the apparatus of the present invention to coat the setup 120, the tank 11 is substantially filled with a refractory slurry such as previously described and the agitator assembly 35 is continuously actuated by the motor 75 and associated chain and sprocket assembly in order to maintain the refractory material of the slurry in suspension. The setup 120 is mounted on the arms 12, 13 with the ends 121, 122 of the setup rod engaged in the sockets 123, 134, respectively, and is preferably continuously rotated throughout the coating operation by the motor 125.

With the setup 120 positioned in the manner shown in FIG. 3, the cover 14 is moved to the closed position illustrated in FIG. 4. Movement of the cover 14 to its closed position permits the support arms 12, 13 to pivot downwardly under the weight of the setup into engagement with the cam rollers 115 and thereby lower the setup into the slurry in the tank 11. Preferably, the arms 12,

13 are lowered to a position in which only the lower rows of patterns 152 of the setup 120 are immersed in the slurry. The height to which the setup 120 is immersed in the slurry can be varied by adjustment of the cam rollers 115 about their eccentric mountings.

The setup 120 is rotated relatively slowly by the gear motor 125, for example, about 5 r.p.m. so that the rows of patterns 152 are continuously moved into the slurry bath at one side of the tank 11 and out of the slurry at the other side of the tank. The rotative movement of the setup constantly changes the angular positions or attitudes of the various patterns 152. This constant changing of the attitudes of the various patterns is advantageous, since the excess slurry is caused to run over the patterns as they are rotated out of the bath and around the axis of the sprue member 150, so as to result in uniform pattern coverage.

It is usually desirable to apply at least the initial slurry coatings under a vacuum in order to remove occluded air in the slurry and to prevent the formation of air bubbles on the surfaces of the patterns. Such a procedure is particularly advantageous with patterns having intricate surface detail and difficult to fill areas, such as small recesses and cavities, which tend to trap air during rotation of the setup. As shown in FIG. 3, a fitting 153 is mounted through the end wall 20 of the frame structure 10 into the chamber 28. A vacuum line (not shown) is adapted to be connected to the fitting 153 and to a suitable vacuum pump. A spring-loaded valve (also not shown) which may be of the type disclosed in U.S. Pat. No. 3,231,946 may be provided in the vacuum line for the purpose of opening the line of atmospheric pressure. When the cover 14 has been moved to the closed position against the seal 97 and the setup 20 has been partially immersed in the slurry, a vacuum is produced within the apparatus, including the tank 11 and the chambers 28, 29 at each end thereof. The vacuum is maintained for a predetermined period of time calculated to remove any air bubbles from the slurry around the patterns. At the end of the vacuum period. the valve in the vacuum line is opened to introduce air at atmospheric pressure into the apparatus. This causes the slurry to be forced by air pressure into all difficult to fill areas and recesses of the patterns.

Following the coating operation, the cover 14 is again opened to the position shown in FIG. 2 to raise the support arms 12, 13 and thereby lift the suported setup 120 out of the slurry. The setup 120 is preferably allowed to remain in the raised position while being rotated by the motor 125 for a short period of time which will allow directional draining of excess slurry from the setup and to obtain uniform external coverage of the patterns without disturbing the slurry which has already been forced into and around the patterns.

Subsequent to the above-described operations, the setup 120 is removed from the arms 12, 13 and is stuccoed with coarser refractory materials, such as by immersing the coated setup in an air-fluidized bed. The stuccoed coating is then allowed to harden, as by forced air drying. Additional slurry coatings may be applied in the same manner, stuccoed and allowed to harden until a ceramic shell of the desired thickness has been produced. It will be understood that the vacuum treatment of the slurry described above may be effected either during each coating operation or during only selected applications of the slurry to the setup. In some instances, the use of a vacuum treatment can be eliminated entirely.

Many modifications and variations of the invention will be apparent to those skilled in the art in view of the foregoing detailed description. Therefore, it is to be understood that, within the scope of the appended claims, the invention can be practiced otherwise than as specifically disclosed.

What I claim is:

1. Apparatus for use in coating a pattern setup with refractory slurry comprising a tank for holding the slurry, a pair of spaced support arms pivot means mounting common end portions of said arms adjacent said tank for swinging movement of said arms about a horizontal pivot axis, means carried by said support arms for holding a pattern setup extending therebetween at a location spaced from said pivot axis and for rotating the setup, and means operatively connected to said arms for swinging them about said pivot axis to raise and lower the setup between a first position in which it is at least partially immersed in slurry within said tank and a second position in which it is withdrawn from the slurry.

2. Apparatus for use in coating a pattern setup with refractory slurry comprising a tank, support means, means mounting said support means for swinging movement about a pivot axis adjacent said tank, holding means carried by said support means for holding a pattern setup for rotation about an axis of rotation which is spaced from said pivot axis along the length of said support means so that axis of rotation is rotatable about said pivot axis during swinging movement of said support means to raise and lower a setup, said holding means being carried by said support means for movement in an arc about said pivot axis with said rotation axis transverse to the plane containing said arc, and means operatively connected to said support means for swinging it about said pivot axis to raise and lower the setup.

3. Apparatus as claimed in claim 1 including an agitator assembly within said tank, actuation means for said agitator assembly mounted externally of said tank, and means extending above the walls of said tank for connecting said actuation means to said agitator assembly.

4. Apparatus as claimed in claim 1 including an agitator within said tank, and actuating means for said agitator mounted externally of said tank, and means connecting said actuating means and said agitator above the walls of said tank.

5. Apparatus as claimed in claim 1 wherein said means operatively connected to said arms comprises a hingedly mounted cover for said tank.

6. Apparatus as claimed in claim 2 including a cover for said tank, and means operatively connecting said cover to said support means for causing said support means to be moved between a first position in which the setup is at least partially immersed in slurry in said tank when the cover is closed and a second position in which the setup is withdrawn from the slurry in said tank when the cover is open.

7. Apparatus for use in coating a pattern setup with refractory slurry comprising structure including a tank for refractory slurry, a pair of support arms, means mounting said support arms for swinging movement about a pivot axis adjacent said tank, said arms being spaced from each other along said pivot axis, means carried by each of said arms between its ends for engaging axially spaced portions of a pattern setup for rotation about a rotation axis extending between said arms so that swinging movement of said arms causes said rotation axis to rotate about said pivot axis, said arms being pivotal between a first position in which a setup supported thereby is at least partially immersed in slurry in said tank and a second position in which the setup is withdrawn from the slurry, an agitator assembly within said tank, and power-actuating means connected to said agitator assembly.

8. Apparatus as claimed in claim 7 including a cover for said tank hinged to said structure, said cover being movable between open and closed positions, and means for effecting an airtight seal between said cover and said structure in said closed position.

9. Apparatus as claimed in claim 8 including means operatively connecting said cover to said support arms for causing said arms to be pivoted when said cover is moved between said open and closed positions.

10. Apparatus for use in coating a pattern setup with refractory slurry comprising a tank, support means, pivot means mounting said support means adjacent said tank for movement about a horizontal pivot axis, means carried by said support means for holding and rotating a pattern setup about an axis of rotation spaced from said pivot axis and lying in a common plane therewith, and means operatively connected to said support means for swinging it about said pivot axis to raise and lower the setup.

11. Apparatus as claimed in claim 10 wherein said means operatively connected to said support means comprises a hingedly mounted cover for closing said tank when said support means has been pivoted to lower the setup.

12. Apparatus as claimed in claim 7 wherein said means for engaging axially spaced portions of a pattern setup comprises cup means carried by each of said arms between its ends, and motor means carried by one of said arms in driving connection with the cup means thereof.

*13. Apparatus for use in coating a pattern set-up with refractory slurry comprising a tank, support means, means mounting said support means adjacent said tank for movement about a first axis transverse to the vertical height of said tank, holding means carried by said support means for holding a pattern set-up for rotation about a second axis which is spaced from said first axis so that said second axis is movable about said first axis during movement of said support means to raise and lower a set-up, said holding means being carried by said support means for movement in an arc about said first axis with said second axis transverse to a plane containing said arc, and means operatively connected to said support means for moving it about said first axis to raise and lower the set-up.*

*14. Apparatus as claimed in claim 13 including means for rotating a pattern set-up held by said holding means about said second axis.*

*15. Apparatus for use in coating a pattern set-up with refractory slurry comprising a tank, support means, means mounting said support means for movement about a first axis adjacent said tank, said support means including holding means for holding a pattern set-up with its longitudinal axis spaced from said first axis so that said set-up moves about said first axis during movement of said support means, said holding means being movable in an arc about said first axis with the longitudinal axis of the set-up transverse to a plane containing said arc, and means operatively connected to said support means for moving it about said first axis to raise and lower the set-up.*

*16. Apparatus as claimed in claim 15 including means for rotating the set-up about its longitudinal axis.*

References Cited

The following references, cited by the Examiner, are of record in the patented file of this patent or the original patent.

UNITED STATES PATENTS

| | | | |
|---|---|---|---|
| 1,264,071 | 4/1918 | Hensrud | 259—112 |
| 1,753,243 | 4/1930 | Liddle | 134—159 |
| 2,437,109 | 3/1948 | Maquat | 118—425 UX |
| 2,808,843 | 10/1957 | McTaggart | 134—159 |
| 3,231,946 | 2/1966 | Watts et al. | 164—26 X |
| 3,249,972 | 5/1966 | Watts et al. | 164—26 |
| 3,429,358 | 2/1969 | Tingquist et al. | 164—26 |

J. SPENCER OVERHOLSER, Primary Examiner

J. E. ROETHEL, Assistant Examiner